United States Patent
Hamdoon et al.

(10) Patent No.: US 9,758,192 B2
(45) Date of Patent: Sep. 12, 2017

(54) UNDERBODY STRUCTURE FOR ABSORBING ENERGY TO IMPROVE ROOF STRUCTURE INTEGRITY DURING SIDE IMPACT

(71) Applicant: Ford Global Technologies, LLC, Dearborn, MI (US)

(72) Inventors: Muhsin M. Hamdoon, Windsor (CA); Marwan Ahmad Elbkaily, Canton, MI (US); Yalla Abushawashi, Allen Park, MI (US); Darrin Neil Wagner, Bloomfield Hills, MI (US); Edgar Edward Donabedian, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 127 days.

(21) Appl. No.: 14/709,006

(22) Filed: May 11, 2015

(65) Prior Publication Data

US 2016/0332672 A1 Nov. 17, 2016

(51) Int. Cl.
*B62D 25/20* (2006.01)
*B62D 21/15* (2006.01)

(52) U.S. Cl.
CPC .................. *B62D 21/157* (2013.01)

(58) Field of Classification Search
CPC .......................... B62D 25/20; B62D 25/2054
USPC ......... 296/187.08, 187.12, 193.07, 204, 205, 296/203.03, 209, 184.1
See application file for complete search history.

(56) References Cited

U.S. PATENT DOCUMENTS

| | | | | |
|---|---|---|---|---|
| RE19,975 E | * | 5/1936 | Swallow | B62D 25/00 296/209 |
| 2,964,331 A | * | 12/1960 | Sherman | B62D 21/07 280/790 |
| 3,132,891 A | * | 5/1964 | Pyuro | B62D 25/025 296/204 |
| 5,155,690 A | * | 10/1992 | Nomaru | G05B 19/4083 29/407.08 |
| 5,213,179 A | | 5/1993 | Goor | |
| 5,352,011 A | * | 10/1994 | Kihara | B62D 23/00 296/203.03 |
| 5,464,266 A | * | 11/1995 | Guertler | B60R 19/42 293/109 |

(Continued)

FOREIGN PATENT DOCUMENTS

| CN | 101233018 A | 7/2008 |
|---|---|---|
| CN | 202641593 U | 1/2013 |

(Continued)

*Primary Examiner* — Hilary Gutman
(74) *Attorney, Agent, or Firm* — Jason Rogers; Brooks Kushman P.C.

(57) ABSTRACT

A vehicle body assembly including a frame with an outrigger secured to the frame below a passenger compartment. The passenger compartment includes a plurality of pillars supporting a roof, a first rocker assembly and a second rocker assembly disposed on opposite sides of the passenger compartment. The outrigger is secured to the frame below the passenger compartment, inboard of the rocker assembly and outboard of the roof to protect the roof in side impact collisions. The outriggers transfer the side impact loads to the frame rails that are disposed inboard of the roof rails.

5 Claims, 5 Drawing Sheets

(56) References Cited

U.S. PATENT DOCUMENTS

| | | | | |
|---|---|---|---|---|
| 5,501,289 | A * | 3/1996 | Nishikawa | B60K 1/04 180/65.1 |
| 5,671,968 | A * | 9/1997 | Masuda | B62D 21/157 296/187.12 |
| 5,820,204 | A * | 10/1998 | Masuda | B62D 21/157 296/187.12 |
| 6,073,992 | A * | 6/2000 | Yamauchi | B62D 23/00 296/187.12 |
| 6,203,099 | B1 * | 3/2001 | Iwatsuki | B62D 21/10 296/204 |
| 6,312,045 | B2 * | 11/2001 | Kitagawa | B62D 25/02 292/24 |
| 6,422,631 | B1 * | 7/2002 | Schmidt | B60N 2/072 296/187.03 |
| 6,431,641 | B2 * | 8/2002 | Miyasaka | B62D 21/15 296/187.12 |
| 6,705,668 | B1 | 3/2004 | Makita et al. | |
| 6,834,912 | B2 * | 12/2004 | Cardimen | B62D 25/025 296/187.08 |
| 6,951,366 | B2 * | 10/2005 | Tomita | B62D 21/09 296/187.08 |
| 7,077,440 | B1 | 7/2006 | Morales et al. | |
| 7,216,924 | B2 * | 5/2007 | Li | B62D 25/025 296/187.12 |
| 7,237,832 | B2 * | 7/2007 | Saeki | B62D 21/157 296/193.06 |
| 7,547,062 | B2 * | 6/2009 | Melz | B60J 5/0458 296/187.12 |
| 7,762,620 | B2 * | 7/2010 | Yao | B60J 5/0427 296/146.6 |
| 8,070,215 | B2 * | 12/2011 | Yoshioka | B62D 21/157 296/187.12 |
| 8,328,235 | B2 * | 12/2012 | Schneider | B60J 5/0487 280/748 |
| 8,608,230 | B2 * | 12/2013 | Young | B60K 1/04 296/187.02 |
| 8,827,355 | B2 * | 9/2014 | Iwamoto | B62D 25/2036 296/187.08 |
| 8,973,693 | B2 * | 3/2015 | Kinsman | B60R 21/13 180/89.1 |
| 9,027,684 | B2 * | 5/2015 | Araki | B60K 1/04 180/311 |
| 9,290,208 | B2 * | 3/2016 | Kishima | B62D 25/2036 |
| 2004/0140693 | A1 * | 7/2004 | Gibbianelli | B62D 21/152 296/203.01 |
| 2004/0195865 | A1 * | 10/2004 | Tomita | B62D 21/09 296/203.04 |
| 2005/0151363 | A1 * | 7/2005 | Saeki | B62D 21/157 280/784 |
| 2008/0238146 | A1 | 10/2008 | Nusier et al. | |
| 2010/0231002 | A1 * | 9/2010 | Yoshioka | B62D 21/157 296/187.12 |
| 2010/0295335 | A1 * | 11/2010 | DeVor | B60N 2/4235 296/187.12 |
| 2011/0049937 | A1 * | 3/2011 | Fujii | B62D 21/157 296/204 |
| 2011/0210581 | A1 * | 9/2011 | Kunishi | B62D 21/157 296/193.01 |
| 2013/0049407 | A1 * | 2/2013 | Kageyama | B62D 25/2018 296/204 |
| 2013/0049408 | A1 * | 2/2013 | Kurogi | B62D 25/02 296/209 |
| 2013/0099461 | A1 | 4/2013 | Otani et al. | |
| 2013/0154308 | A1 | 6/2013 | Sotoyama et al. | |
| 2014/0117716 | A1 * | 5/2014 | Patberg | B62D 21/157 296/187.08 |
| 2014/0191535 | A1 * | 7/2014 | Sugiyama | B62D 25/16 296/193.05 |
| 2014/0333091 | A1 | 11/2014 | Stockard et al. | |
| 2014/0354008 | A1 | 12/2014 | Sakakibara et al. | |
| 2015/0176673 | A1 * | 6/2015 | Kaneko | B62D 21/157 188/377 |
| 2015/0375794 | A1 * | 12/2015 | May | B62D 27/023 296/187.12 |
| 2016/0059904 | A1 * | 3/2016 | Kerscher | B62D 25/20 296/187.03 |
| 2016/0068196 | A1 * | 3/2016 | Saeki | B62D 25/2036 296/187.08 |
| 2016/0083017 | A1 * | 3/2016 | Sakaguchi | B62D 21/157 296/187.12 |
| 2016/0137226 | A1 * | 5/2016 | Wolf | B62D 25/20 296/203.01 |
| 2016/0194034 | A1 * | 7/2016 | Emura | B62D 25/025 296/209 |
| 2016/0236719 | A1 * | 8/2016 | Tanaka | B62D 21/157 |
| 2016/0264177 | A1 * | 9/2016 | Kawaguchi | B62D 21/157 |
| 2016/0332674 | A1 * | 11/2016 | Okuyama | B62D 25/04 |

FOREIGN PATENT DOCUMENTS

| | | | |
|---|---|---|---|
| CN | 103562055 A | 2/2014 | |
| DE | 19860005 A1 * | 6/2000 | B62D 21/10 |
| DE | 102013209095 A1 * | 11/2014 | B62D 25/2036 |
| FR | 3024422 A1 * | 2/2016 | B62D 21/157 |
| JP | EP 2060474 A1 * | 5/2009 | B62D 25/20 |
| JP | WO 2011061829 A1 * | 5/2011 | B62D 21/02 |
| JP | WO 2013031008 A1 * | 3/2013 | B62D 25/2036 |
| JP | WO 2016051867 A1 * | 4/2016 | B62D 25/02 |
| WO | 2014162573 A1 | 10/2014 | |

* cited by examiner

UNDERBODY STRUCTURE FOR
ABSORBING ENERGY TO IMPROVE ROOF
STRUCTURE INTEGRITY DURING SIDE
IMPACT

TECHNICAL FIELD

This disclosure relates to vehicle structures located below the passenger cabin that improve the performance of a vehicle roof in a side impact collision.

BACKGROUND

Vehicles are being designed with a view to reducing the mass of the vehicle but all prevailing safety tests must be met for a design to be acceptable. One test that must be met is FMVSS 214 that is referred to as the Oblique Pole Side Impact Test. In the Oblique Pole Side Impact Test the side of the vehicle is driven into a pole that extends from the ground up to the roof of the vehicle. One unsatisfactory result of this test is that the roof integrity may be compromised as a result of the test.

This disclosure is directed to providing a vehicle body structure that reduces the possibility of roof issues during the 20 MPH Oblique Pole Side Impact Test. This problem and other problems are addressed by this disclosure as summarized below.

SUMMARY

According to one aspect of this disclosure, a vehicle body assembly is disclosed that includes a frame that includes an outrigger secured to the frame below a passenger compartment. The passenger compartment includes a plurality of pillars supporting a roof, a first rocker assembly and a second rocker assembly disposed on opposite sides of the passenger compartment. The outrigger is secured to the frame below the passenger compartment, inboard of the rocker assembly and outboard of the roof to protect the roof in side impact collisions.

According to other aspects of this disclosure the vehicle body assembly may further comprise a front bracket connecting a front end of the outrigger to the frame, and a rear bracket connecting a rear end of the outrigger to the frame. The front bracket and the rear bracket extend in a horizontal plane from the frame to the outrigger.

The plurality of pillars may further comprise a first A-pillar and a second A-pillar provided on opposite sides of the passenger compartment and a first B-pillar and a second B-pillar provided on opposite sides of the passenger compartment. A right roof rail connects one of the A-pillars and one of the B-pillars on a right side of the passenger compartment and a left roof rail connects one of the A-pillars and one of the B-pillars on a side of the passenger compartment. The outrigger is disposed parallel to and outboard of the right roof rail and the left roof rail. The outrigger may be connected to the frame by a bracket that is cantilevered from the frame.

According to another aspect of this disclosure, a vehicle body assembly is provided that comprises a pair of longitudinal frame rails, a floor pan supported on the frame rails and a pair of rockers each attached to a lateral side of the floor pan. The body assembly also includes a roof supported above the floor pan on a plurality of pillars and a right roof rail and a left roof rail, wherein the right and left roof rails are laterally inboard of the rockers. A pair of reinforcement outriggers are each attached to and cantilevered laterally outward from one of the frame rails and extend laterally outboard of the roof rails and inboard of the rockers.

According to another aspect of this disclosure, at least one cross-vehicle reinforcement bar may be attached to the frame rails that extend in a transverse vehicle direction, connecting the pair of reinforcement outriggers together below the floor pan.

The outriggers may further comprise a longitudinally extending side impact absorbing bar, a forward bracket attaching one of the frame rails to a front end of the longitudinally extending side impact absorbing bar, and a rearward bracket attaching the other one of the frame rails to a rear end of the longitudinally extending side impact absorbing bar.

The outriggers may further comprise a planar plate attached to each one of the frame rails. The planar plate may define a plurality of openings that reduce the weight of the planar plate. The outriggers may be spaced inwardly from the rockers.

According to another aspect of this disclosure, a side impact absorbing system is disclosed for a vehicle including a pair of longitudinal frame rails, a floor pan supported on the frame rails, a pair of rockers each attached to a lateral side of the floor pan, and a roof supported above the floor pan on a plurality of pillars and a right roof rail and a left roof rail. The side impact absorbing system may further comprise a pair of outriggers each attached to one of the frame rails to extend outboard of the frame rails and roof rails. The outriggers may be spaced from the rocker so that a side impact load applied to the rockers compresses the rockers that are driven into the outriggers. The outriggers transfer the side impact loads to the frame rails that are disposed inboard of the roof rails.

In the impact absorbing system, the outriggers may further comprise a front bracket connecting a front end of the outrigger to the frame, and a rear bracket connecting a rear end of the outrigger to the frame. The front bracket and the rear bracket extend in a horizontal plane from the frame to the outrigger. The outrigger is disposed parallel to and outboard of the right roof rail and the left roof rail. Impact loads applied to the frame rails by the rocker assemblies and the outriggers are partially absorbed by the cross-vehicle reinforcement bar and the floor pan.

The above aspects of this disclosure and other aspects will be described below in detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
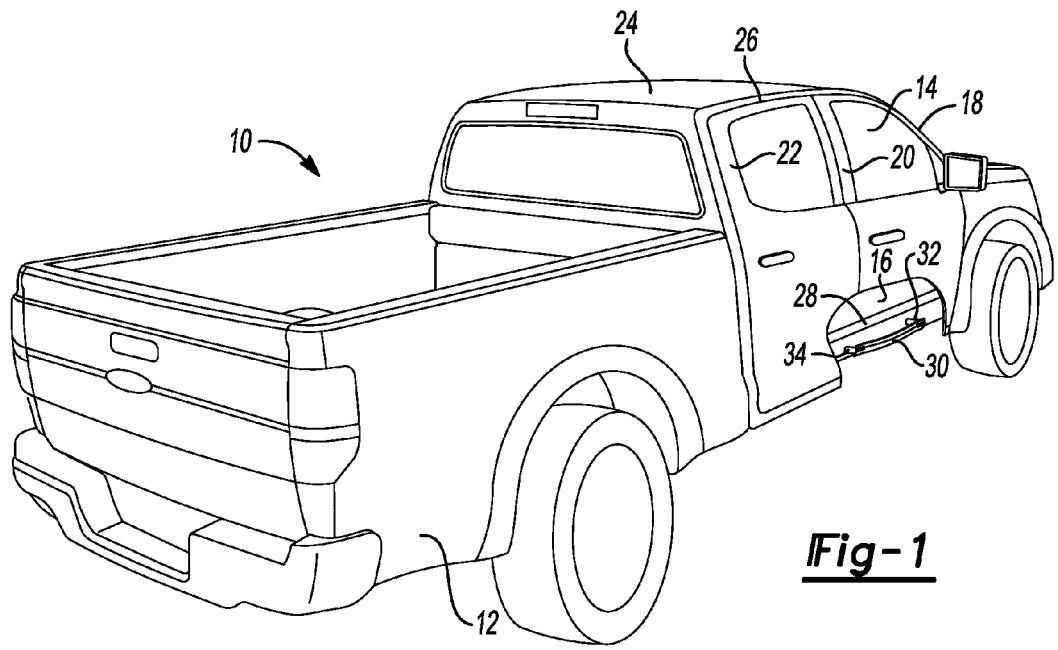
FIG. 1 is a side/rear perspective view of a vehicle, a pick-up truck, having a lower portion of the doors of the passenger compartment removed to show the location of a side impact absorbing outrigger.

Referring to FIG. 1, a vehicle 10 (e.g., a pick-up truck) is illustrated that includes a body 12 that defines a passenger compartment 14. The vehicle 10 includes a floor pan 16 that defines the lower portion of the passenger compartment 14. The vehicle body 12 includes a plurality of pillars, including an A-pillar 18, a B-pillar 20, and a C-pillar 22. The pillars 18-22 support a roof 24 of the vehicle 10. A pair of roof rails 26 are provided on right and left sides of the roof 24. The floor pan 16 is assembled to a frame rail 28 of a vehicle 10 that includes a conventional frame. It should be understood that the frame may be a unibody frame that is integrally formed as part of the body 12 of the vehicle 10.

The frame rails 28 extend in a longitudinal direction and provide support for the body 12. An outrigger 30, or side impact absorbing bar, is attached to the frame rail 28 to provide additional support below the passenger compartment 14. The outrigger 30 provides additional side impact protection in a side impact test and is effective to prevent disconnection of the roof 24 from the roof rails 26 in the side impact. The outrigger 30 is attached to the frame rail 28 by a front bracket 32 at a front end of the outrigger. A rear bracket 34 is provided to connect the outrigger 30 to the frame rail 28 at a rear end 35 of the outrigger 30.

Figure 2:
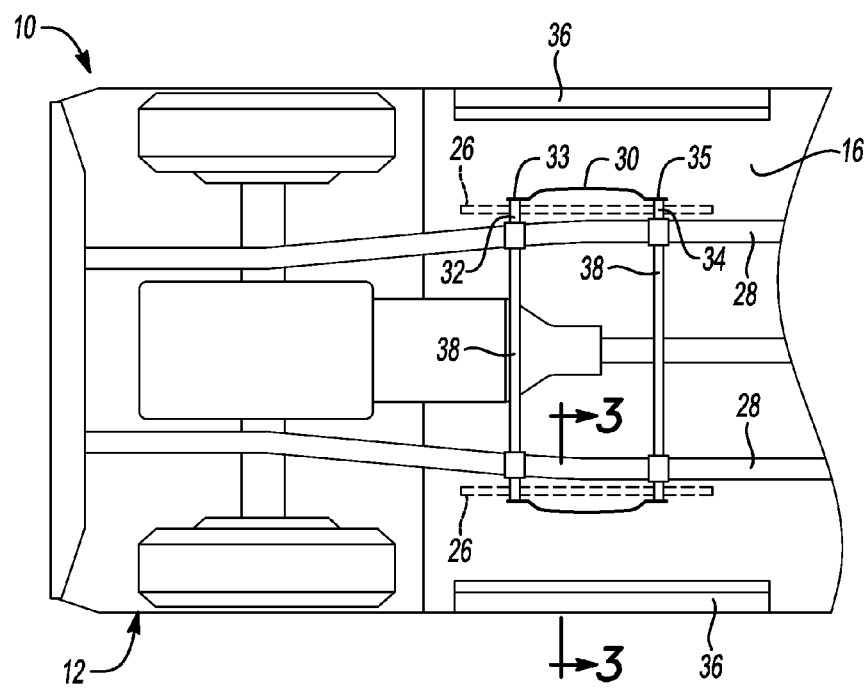
FIG. 2 is a bottom plan view of a vehicle showing the side impact absorbing outrigger of FIG. 1.

Referring to FIG. 2, the vehicle 10 is shown in a bottom perspective view illustrating the relative location of the frame rail 28 of the vehicle 10 within the body 12. A roof rail 26 is shown in phantom lines to be disposed outboard of the frame rails 28 and inboard of the outrigger 30. The outrigger 30 is also disposed inboard of a rocker assembly 36. The outrigger 30 is disposed below the floor pan 16. Two outriggers 30 are shown attached to right and left frame rails 28.

Reinforcement bars 38, or cross-vehicle reinforcements, are shown extending between the frame rails 28. The reinforcement bars 38 are aligned with the front bracket and rear bracket 32 and 34 of the outrigger 30 to provide additional support and reinforcement in a side impact.

Figure 3:
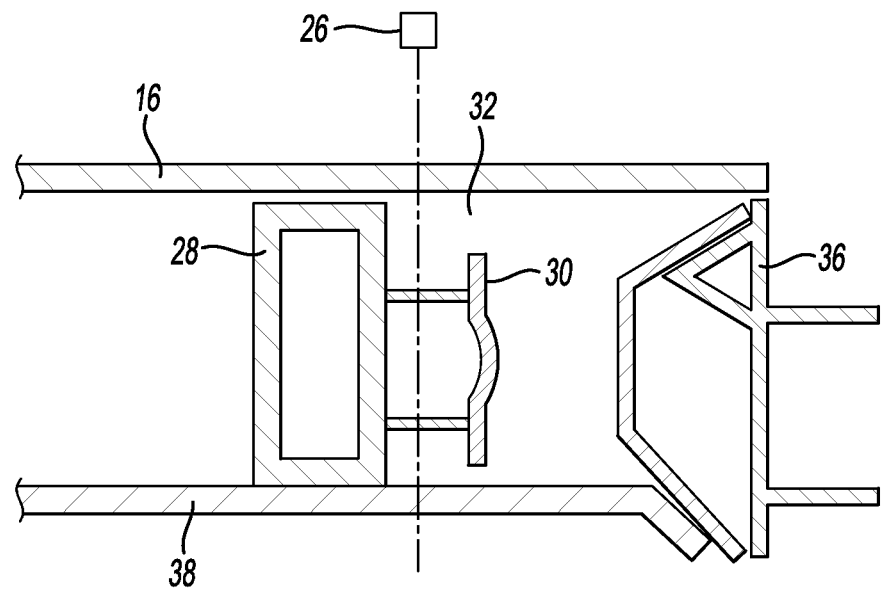
FIG. 3 is a cross-sectional view taken along the line 3-3 in FIG. 2.

Referring to FIG. 3, a diagrammatic cross-sectional view is provided of the relative location of the frame rail 28, rocker assembly 36 and outrigger 30. The frame rail 28 is disposed below the floor pan 16 and is inboard of the rocker assembly 36. The outrigger 30 is supported by the front bracket 32. The roof rail 26 is shown diagrammatically to illustrate the relative location of the roof rail 26 relative to the outrigger 30 wherein the roof rail 26 is disposed inboard of the outrigger 30 and outboard of the frame rail 28.

In a side impact, the rocker assembly 36 may be driven inwardly until it contacts the outrigger 30. The outrigger 30 transmits the impact force through the front bracket 32 and rear bracket 34 (not shown in FIG. 3). The force transmitted to the outrigger 30 and the brackets 32 and 34 reduces the load applied to the roof rail 26 in a side impact collision. The brackets 32, 34 transmit the impact force to the frame rail 28.

Figure 4:
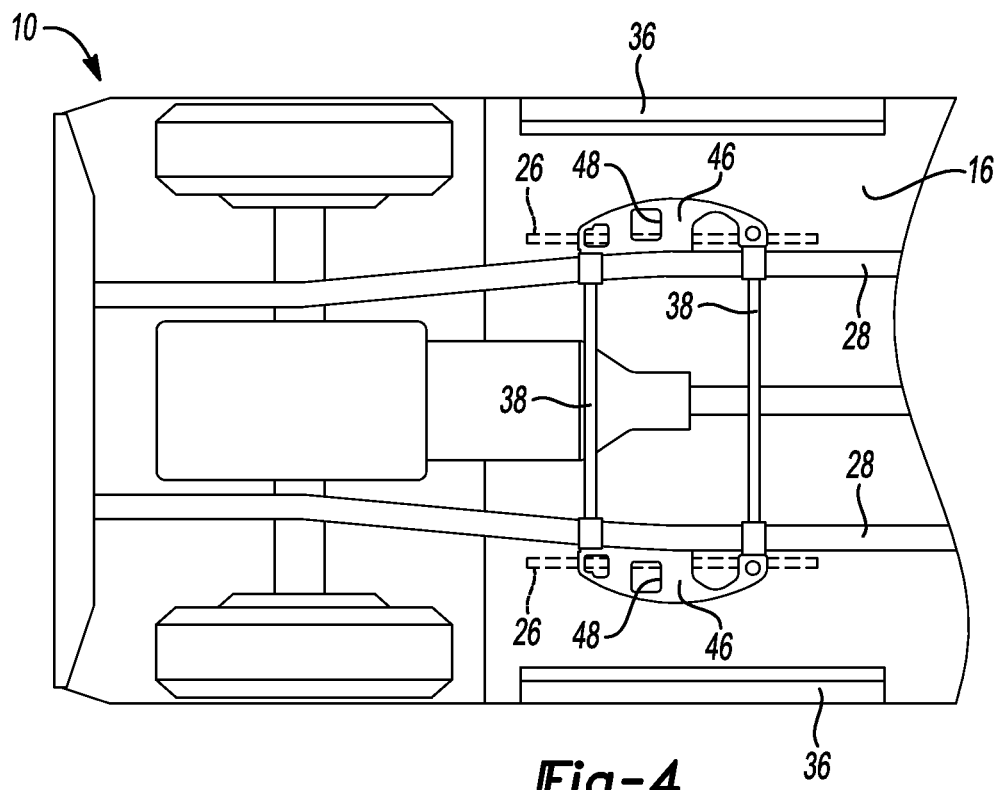
FIG. 4 is a bottom plan view of a vehicle including a planar plate outrigger.

Referring to FIG. 4, a vehicle 10 is shown that includes a planar plate-shaped outrigger on both frame rails 28 of the vehicle 10. A plurality of openings 48 are defined by the planar plate outrigger 46. The planar plate outriggers 46 extend outboard in a lateral direction to a greater extent than the roof rails 26 that are shown in phantom lines. The planar plate outriggers 46 are outboard of the frame rails 28 and spaced inwardly from the rockers 36.

Figure 5:
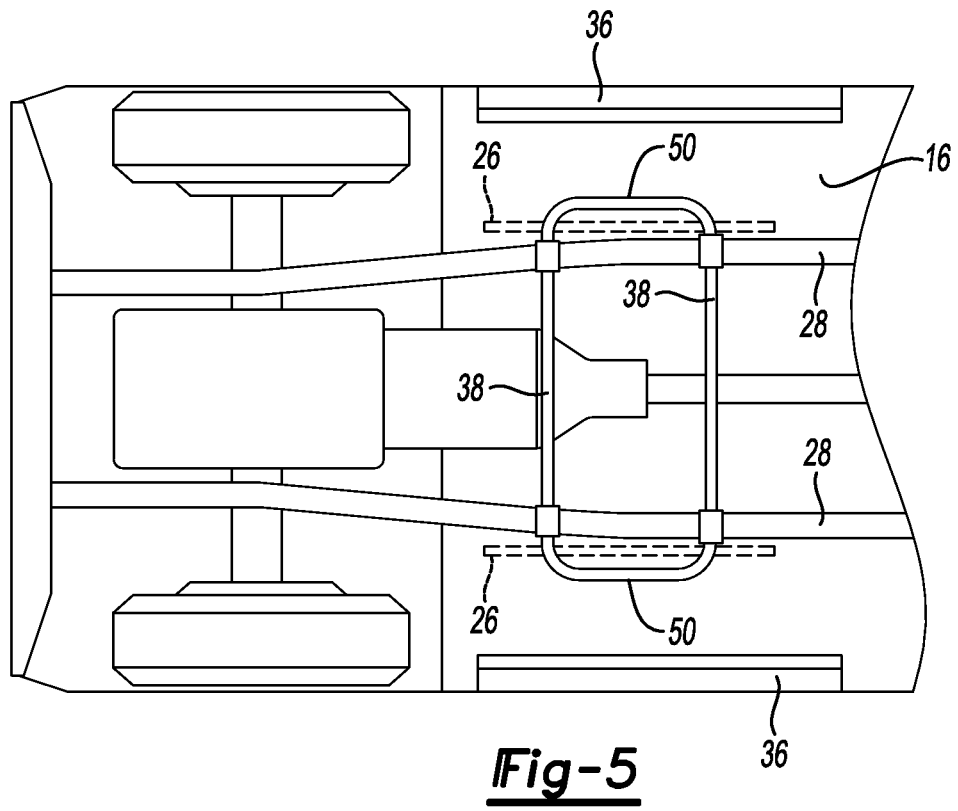
FIG. 5 is a fragmentary bottom plan view of another alternative embodiment of an outrigger in the form of a U-shaped tube.

Referring to FIG. 5, another alternative embodiment is shown in which a vehicle 10 is provided with two U-shaped tubes 50. The U-shaped tubes 50 may be hydro-formed tubes that may be formed into a U-shape and then attached to the frame rails 28 of the vehicle 10. The U-shaped tube outrigger 50 extends in the lateral direction to a greater extent than the roof rail 26 shown in phantom lines in FIG. 5. The U-shaped tube outriggers 50 are outboard of the frame rails 28 and spaced inwardly from the rockers 36.

Figure 6:
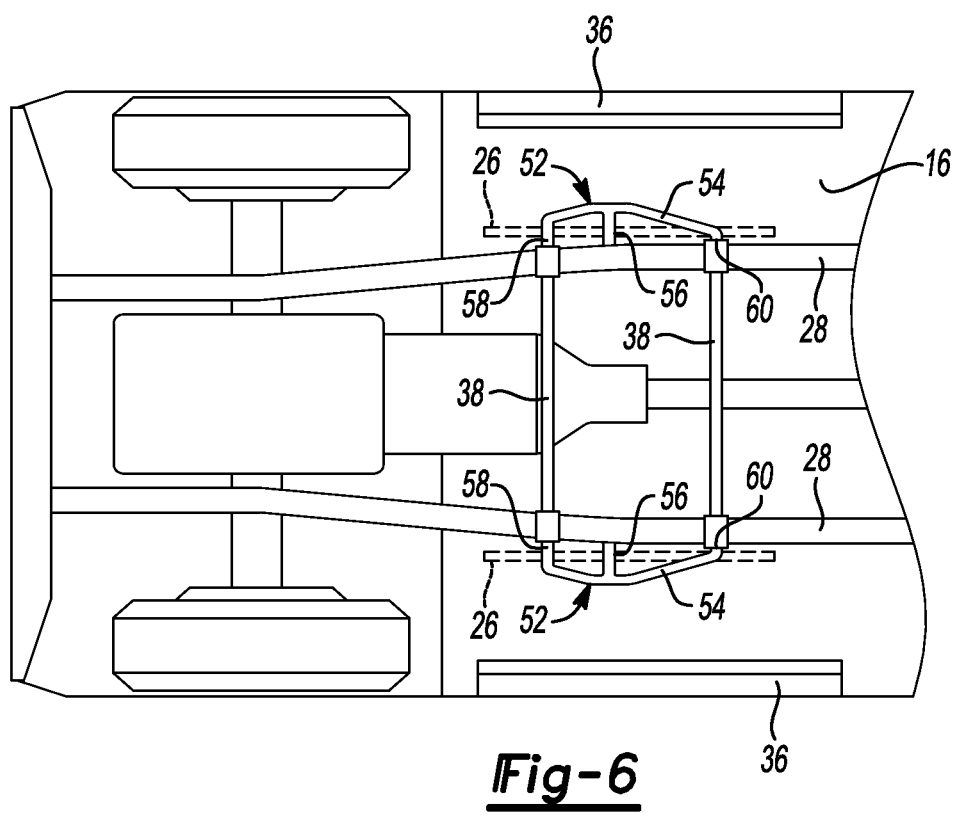
FIG. 6 is a fragmentary bottom plan view of another alternative embodiment of a tubular outrigger including an intermediate tubular member.

Referring to FIG. 6, another alternative embodiment is shown in which a tubular outrigger assembly 52 is attached to the frame rails 28 of the vehicle 10. The tubular outrigger assembly 52 includes an outer tube 54. An intermediate tubular reinforcement 56 is attached to the outer tube 54. A front end 58 and rear end 60 of the outer tube 54 are attached to the frame rails 28. The intermediate tubular reinforcement 56 may also be attached to the frame rail 28 to provide additional support for the tubular outrigger assembly 52 on the frame rail 28. The outer tube 54 of the tubular outrigger assembly 52 is laterally outboard of the roof rails 26 shown in phantom in FIG. 6. The tubular outrigger assemblies 52 are outboard of the frame rails 28 and spaced inwardly from the rockers 36.

Figure 7:
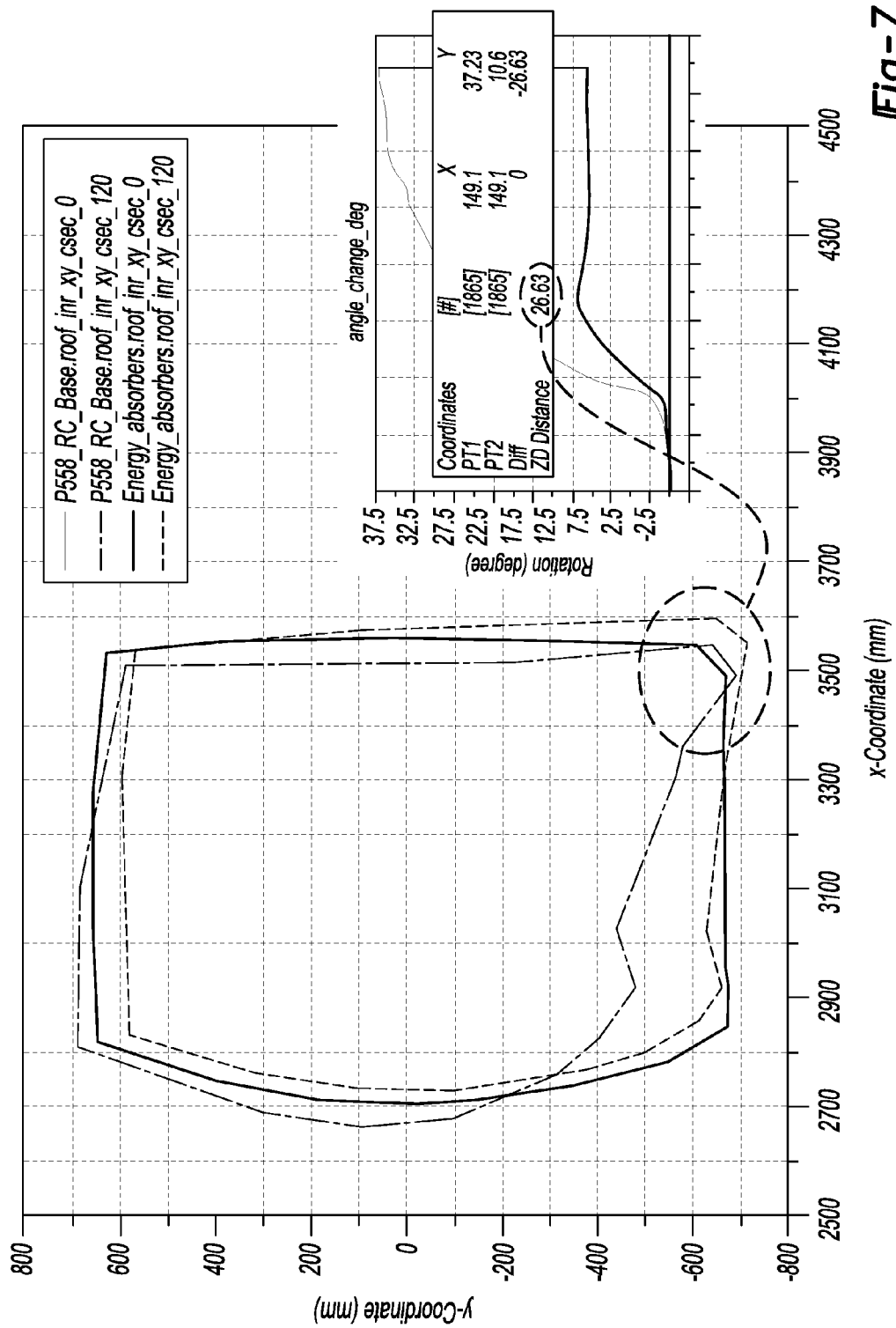
FIG. 7 is a chart showing the base roof structure of a vehicle (solid line) including a comparison of the roof structure after a side impact test comparing the shape of the roof at 120 ms after impact with and without an outrigger (long dash—short dash lines).

Referring to FIG. 7, a chart showing the extent of intrusion in a simulated Oblique Pole Side Impact Test without the outrigger is compared to a simulated side impact with the outrigger. Without the outrigger, the side impact rear corner angle change was 37°. The rear corner angle change with the outrigger was 10°. The difference was about 27°.

Figure 8:
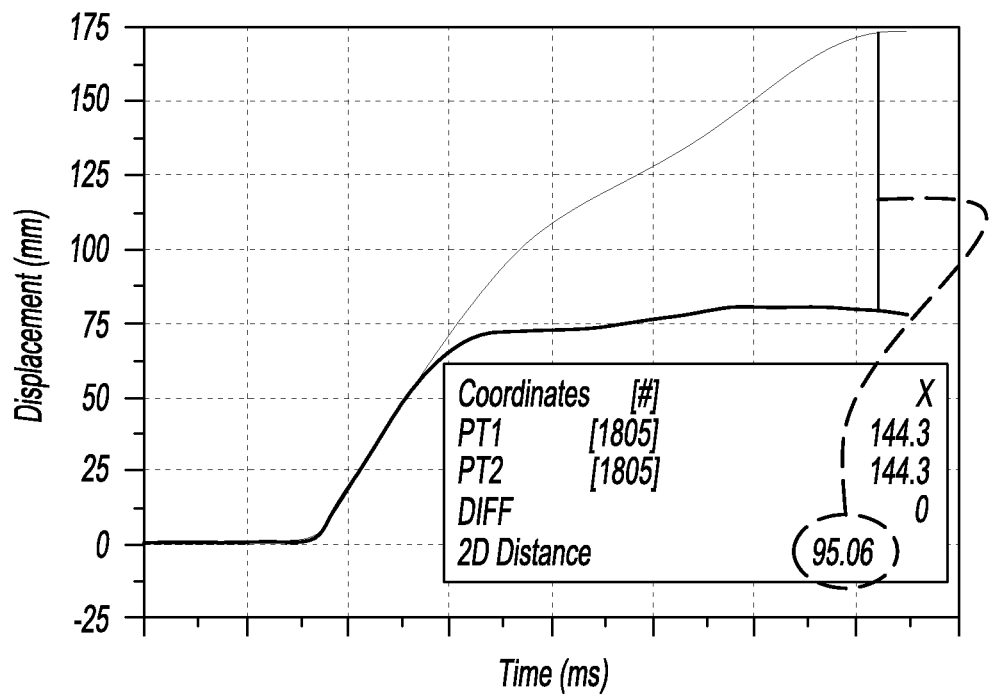
FIG. 8 is a chart showing displacement in millimeters of roof intrusion in a side impact test comparing a roof including an outrigger (thick line) to one not including the outrigger (thin line).

Referring to FIG. 8, the displacement in millimeters of the roof intrusion for the simulated Oblique Pole Side Impact Test for the base line without the outrigger was 175 mm (thin line). The simulated Oblique Pole Side Impact Test roof intrusion for the vehicle including outriggers was 80 mm (thick line). The difference as measured in this simulated test was 95 mm.

Figure 9:
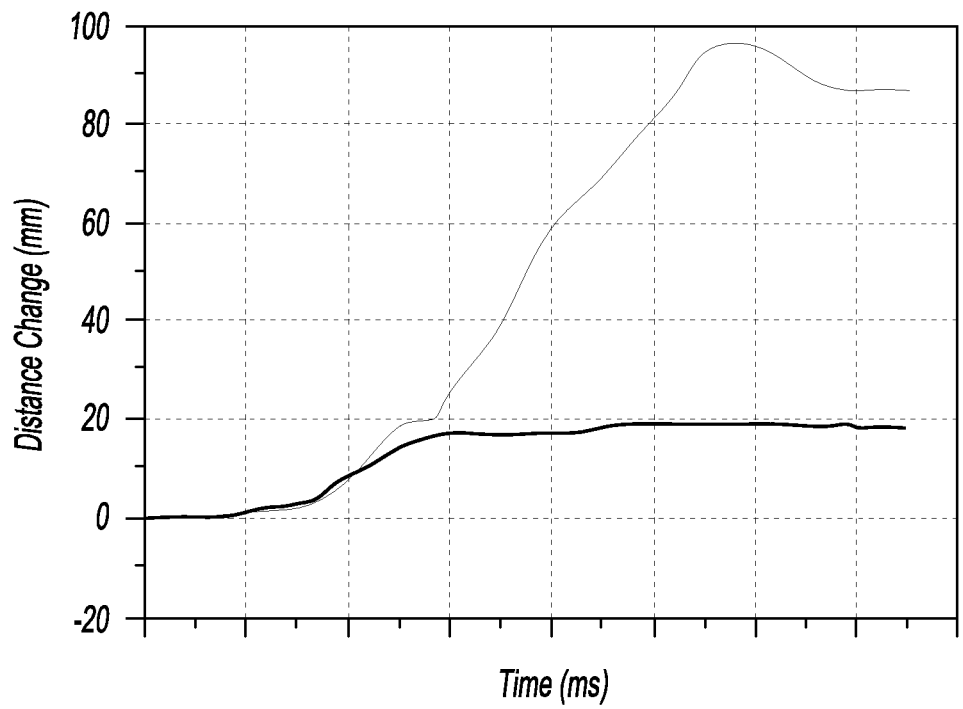
FIG. 9 is a chart showing the diagonal expansion of the roof in a side impact comparing a base vehicle (thin line) to a vehicle including the outriggers (thick line).

Referring to FIG. 9, the diagonal expansion of the roof was compared in a simulated test for a base line vehicle without the outrigger (thin line) to a vehicle including an outrigger (thick line). The base line vehicle experienced a diagonal expansion as measured from the B-pillar on the driver's side to the A-pillar on the passenger side for the base line at 115 ms was 95 mm. The diagonal expansion for the vehicle including an outrigger at 115 ms was 20 mm. The difference was 75 mm which indicates improvement in match boxing of the roof structure.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle body assembly comprising:
    a pair of longitudinal frame rails;
    a floor pan supported on the frame rails;
    rockers attached to lateral sides of the floor pan;
    a roof having sides laterally inboard of the rockers; and
    planar plates defining openings that reduce the weight of the planar plates are attached to and cantilevered laterally outward from the frame rails, the planar plates extend laterally outboard of the roof and are inboard of the rockers.

2. The vehicle body assembly of claim 1 wherein the planar plates include a right-side planar plate, and a left-side planar plate.

3. The vehicle body assembly of claim 1 further comprising:
    at least one cross-vehicle reinforcement bar extending in a transverse vehicle direction and being attached to the frame rails and the planar plates together below the floor pan.

4. The vehicle of claim 3 wherein impact loads applied to the frame rails by the planar plates are partially absorbed by the cross-vehicle reinforcement bar and the floor pan.

5. The vehicle of claim 1 wherein the planar plates are disposed parallel to and outboard of a right roof rail and a left roof rail.

* * * * *